United States Patent
Wang

(10) Patent No.: US 12,015,885 B2
(45) Date of Patent: Jun. 18, 2024

(54) COLOR GAMUT MAPPING METHOD AND COLOR GAMUT MAPPING DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Zhongbin Wang, Guangdong (CN)

(73) Assignees: Huizhou China Star Optoelectronics Display Co., Ltd., Guangdong (CN); TCL China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 17/622,811

(22) PCT Filed: Dec. 20, 2021

(86) PCT No.: PCT/CN2021/139708
§ 371 (c)(1),
(2) Date: Dec. 25, 2021

(87) PCT Pub. No.: WO2023/108682
PCT Pub. Date: Jun. 22, 2023

(65) Prior Publication Data
US 2024/0031541 A1    Jan. 25, 2024

(30) Foreign Application Priority Data
Dec. 13, 2021 (CN) .......................... 202111523304.2

(51) Int. Cl.
*H04N 9/76* (2006.01)
(52) U.S. Cl.
CPC ................................... *H04N 9/76* (2013.01)

(58) Field of Classification Search
CPC ........ H04N 9/76; H04N 9/3182; H04N 23/84; H04N 23/841; H04N 1/6058;
(Continued)

(56) References Cited

U.S. PATENT DOCUMENTS

| | | | |
|---|---|---|---|
| 2006/0119870 A1* | 6/2006 | Ho | ........................ H04N 1/6058 358/1.9 |
| 2010/0008427 A1* | 1/2010 | Chiu | ....................... H04N 19/60 375/240.18 |
| 2019/0147832 A1 | 5/2019 | Kim et al. | |

FOREIGN PATENT DOCUMENTS

| CN | 101009852 A | 8/2007 |
|---|---|---|
| CN | 102119532 A | 7/2011 |

(Continued)

OTHER PUBLICATIONS

International Search Report in International application No. PCT/CN2021/139708, dated Sep. 20, 2022.

(Continued)

*Primary Examiner* — Yassin Alata
(74) *Attorney, Agent, or Firm* — PV IP PC; Wei Te Chung; Zhigang Ma

(57) ABSTRACT

The present application provides a color gamut mapping method and a color gamut mapping device for use in a splicing display device. Display screens in the splicing display device have different color gamuts. By mapping the color gamuts of multiple display screens to the display screen which is the uniquely determined display screen in the splicing display device, the color gamuts of all the display screens in the splicing display device are the same, and colors displayed on different screens are also the same. Accordingly, the present application improves uneven images and the image quality.

20 Claims, 4 Drawing Sheets

(58) Field of Classification Search
CPC .. H04N 1/6061; H04N 1/6066; G09G 3/2003; G09G 5/026; G09G 2340/06; G09G 2320/0242; G09G 2320/0666
See application file for complete search history.

(56) References Cited

FOREIGN PATENT DOCUMENTS

| | | | |
|---|---|---|---|
| CN | 110570811 | A | 12/2019 |
| CN | 110728941 | A | 1/2020 |
| CN | 113496683 | A | 10/2021 |
| JP | 2006203802 | A | 8/2006 |

OTHER PUBLICATIONS

Written Opinion of the International Search Authority in International application No. PCT/CN2021/139708, dated Sep. 20, 2022.

\* cited by examiner

COLOR GAMUT MAPPING METHOD AND COLOR GAMUT MAPPING DEVICE

FIELD OF DISCLOSURE

The present invention relates to a field of display technology and in particular, to a color gamut mapping method and a color gamut mapping device.

DESCRIPTION OF RELATED ART

At present, in a field of splicing display technology, different splicing screens display different images, and the images displayed on multiple splicing screens are joined to become a complete screen image.

However, in conventional splicing screens, different types of display screens are usually spliced together. For example, LED screens and LCD screens are spliced together for display. However, different types of display screens have different color gamuts, which causes a non-uniform screen image of a splicing screen when viewed with human eyes, which affects screen display quality.

SUMMARY

The present invention provides a color gamut mapping method and a color gamut mapping device, thereby solving a problem of uneven images of a splicing display panel in conventional techniques, which affects image display quality.

In one aspect, the present application provides a color gamut mapping method, for use in a splicing display device, wherein the splicing display device comprises a first display screen and a second display screen spliced together, and a color gamut of the first display screen in a preset color gamut coordinate system corresponds to a first color gamut triangle, a color gamut of the second display screen in the preset color gamut coordinate system corresponds to a second color gamut triangle corresponding to the first color gamut triangle formed in a preset coordinate system, the color gamut of the second display screen corresponds to the second color gamut triangle formed in the preset coordinate system, and the color gamuts of the first display screen and the second display screen are different; wherein the color gamut mapping method comprises:
  rotating the first color gamut triangle so that color gamut sides of the rotated first color gamut triangle are parallel to respective color gamut sides of the second color gamut triangle to obtain a third color gamut triangle;
  determining a color gamut adjustment scaling factor of the first color gamut triangle according to the third color gamut triangle and the first color gamut triangle; and
  scaling the third color gamut triangle according to the color gamut adjustment scaling factor, such that the third color gamut triangle is converted to the second color gamut triangle, and the color gamut of the first display screen matches the color gamut of the second display screen.

By mapping different color gamut triangles of different display screens to the display screen which is the uniquely determined display screen in the splicing display device, the color gamuts of all the display screens in the splicing display device are the same, and colors displayed on different screens are also the same, thus improving uneven images and the image quality.

In one embodiment, the first color gamut triangle comprises a first red main vertex, a first green main vertex, and a first blue main vertex, and the second color gamut triangle comprises a second red main vertex, a second green main vertex, and a second blue main vertex;
  in the step of rotating the first color gamut triangle, so that the color gamut sides of the rotated first color gamut triangle are parallel to the respective color gamut sides of the second color gamut triangle to obtain the third color gamut triangle, the color gamut mapping method comprises:
  determining a position of a color gamut white point in the second display screen; and
  rotating the first red main vertex, the first green main vertex, and the first blue main vertex around the color gamut white point, so that the color gamut sides of the rotated first color gamut triangle are parallel to the respective color gamut sides of the second color gamut triangle to obtain the third color gamut triangle.

The present embodiment provides a specific method for obtaining the third color gamut triangle by conversion. By rotating the first color gamut triangle, the three color gamut sides of the first color gamut triangle are parallel to the three color gamut sides of the unrotated third color gamut triangle, and the first color gamut triangle is mapped to a plane where the third color gamut triangle is located, so that the third color gamut triangle can be obtained through fewer adjustment steps.

In one embodiment, the step of rotating the first red main vertex, the first green main vertex, and the first blue main vertex around the color gamut white point, so that the color gamut sides of the rotated first color gamut triangle are parallel to the respective color gamut sides of the second color gamut triangle to obtain the third color gamut triangle, the color gamut mapping method comprises:
  rotating a first connection line around the color gamut white point to an extension line of a second connection line, and determining that a rotation intersection point is a third red main vertex of the third color gamut triangle, wherein a length of the first connection line is equal to a length of a third connection line, the first connection line is a connecting line between the color gamut white point and the first red main vertex, the second connection line is a connecting line between the color gamut white point and the second red main vertex, and the third connection line is a connecting line between the color gamut white point and the third red main vertex;
  rotating a fourth connecting line around the color gamut white point to an extension line of a fifth connection line, and determining that a rotation intersection point is a third green main vertex of the third color gamut triangle, wherein a length of the fourth connection line is equal to a length of a sixth connection line, the fourth connection line is a connecting line between the color gamut white point and the first green main vertex, the fifth connection line is a connecting line between the color gamut white point and the second green main vertex, and the sixth connection line is a connecting line between the color gamut white point and the third green main vertex; and
  rotating a seventh connection line around the color gamut white point to an extension line of an eighth connection line, and determining that a rotation intersection point is a third blue main vertex of the third color gamut triangle, wherein a length of the seventh connection line is equal to a length of a ninth connection line, and the seventh connection line is a connecting line between the color gamut white point and the first blue main vertex, and the eighth connection line is a connecting line between the color gamut white point and the second blue main vertex, and the ninth connection line is a connecting line between the color gamut white point and the third blue main vertex;

wherein an enclosed area among the third red main vertex, the third blue main vertex, and the third green main vertex is the third color gamut triangle.

In the present embodiment, the connecting lines from different color gamut vertices in the first color gamut triangle to the color gamut white point are rotated, and rotated to extension lines of the connecting lines from different color gamut vertices in the third color gamut triangle to the color gamut white point to obtain three rotated color gamut sides of the first color gamut triangle. Then, with the three rotated color gamut sides, the second color gamut triangle after the rotation of the first color gamut triangle is determined. Such an adjustment is easy.

In one embodiment, the step of determining the color gamut adjustment scaling factor of the first color gamut triangle according to the third color gamut triangle and the first color gamut triangle comprises:
  calculating a first angle parameter based on the connecting line between each vertex in the first color gamut triangle and the color gamut white point;
  calculating a second angle parameter based on the connecting line between each vertex in the second color gamut triangle and the color gamut white point; and
  calculating a color gamut adjustment scaling factor of the first color gamut triangle according to the first angle parameter and the second angle parameter.

The present embodiment calculates the first angle parameter of the first color gamut triangle before rotation, and the second angle parameter of the second color gamut triangle after rotation. The first angle parameter and the second angle parameter are used to determine the color gamut adjustment scaling factor after the first color gamut triangle is rotated. The calculation is simple.

In one embodiment, the step of calculating the first angle parameter based on the connecting line between each vertex in the first color gamut triangle and the color gamut white point comprises:
  determining a first included angle defined by the first green main vertex, the color gamut white point, and the first red main vertex;
  determining a second included angle defined by the first red main vertex, the color gamut white point, and the first green main vertex; and
  determining a third included angle defined by the first red main vertex, the color gamut white point, and the first blue main vertex;
  wherein the first angle parameter comprises the first included angle, the second included angle, and the third included angle.

The present embodiment calculates the angles corresponding to different vertices in the first color gamut triangle to determine the first angle parameter of the first color gamut triangle.

In one embodiment, the step of calculating the second angle parameter based on the connecting line between each vertex in the third color gamut triangle and the color gamut white point comprises:
  calculating a fourth included angle defined by the third blue main vertex, the color gamut white point, and the third red main vertex;
  calculating a fifth included angle defined by the third red main vertex, the color gamut white point, and the third green main vertex; and
  calculating a sixth included angle defined by the third red main vertex, the color gamut white point, and the third blue main vertex;
  wherein the second angle parameter comprises the fourth included angle, the fifth included angle, and the sixth included angle.

The present embodiment calculates the angles corresponding to different vertices in the third color gamut triangle to determine the second angle parameter of the third color gamut triangle.

In one embodiment, the step of calculating the color gamut adjustment scaling factor of the first color gamut triangle according to the first angle parameter and the second angle parameter comprises:
  calculating a first color gamut adjustment scaling factor according to the first included angle and the fourth included angle;
  calculating a second color gamut adjustment scaling factor according to the first included angle and the fifth included angle; and
  calculating a third color gamut adjustment scaling factor according to the first included angle and the sixth included angle;
  wherein the color gamut adjustment scaling factor comprises the first color gamut adjustment scaling factor, the second color gamut adjustment scaling factor, and the third color gamut adjustment scaling factor.

According to the two angle parameters before and after the rotation of each included angle in the first color gamut triangle, the different color gamut adjustment scaling factors corresponding to the included angles in the first color gamut triangle are determined to adjust the rotated third color gamut triangle according to the color gamut adjustment scaling factor.

In one embodiment, in the step of scaling the third color gamut triangle according to the color gamut adjustment scaling factor, such that the third color gamut triangle is converted to the second color gamut triangle, and the color gamut of the first display screen matches the color gamut of the second display screen, the color gamut mapping method comprises:
  taking any color point in the first color gamut triangle as a target color point, and calculating color gamut coordinates of the target color point in the second color gamut triangle according to the color gamut adjustment scaling factor; and
  adjusting coordinates of the target color point based on the color gamut coordinates, such that the target color point is converted into a color point in the second color gamut triangle.

According to the color gamut adjustment scaling factor, the present application can calculate the color gamut coordinates of the color point of the first color gamut triangle in the second color gamut triangle, and then determine the color gamut coordinates of each color point of the first color gamut triangle in the second color gamut triangle. Therefore, the first color gamut triangle can be mapped to the second color gamut triangle to realize the mapping from the first color gamut triangle to the second color gamut triangle, and improve uneven images and the image quality of the first display screen and the second display screen.

In one embodiment, the step of calculating the color gamut coordinates of the target color point in the second color gamut triangle according to the color gamut adjustment scaling factor comprises:

calculating a distance between the target color point and the color gamut white point;

calculating a line-included angle between a connecting line from the target color point to the color gamut white point and a horizontal line in the preset coordinate system;

calculating a surface-included angle between a color gamut area where the target color point is located and a horizontal area in the preset coordinate system; and calculating the color gamut coordinates of the target color point in the second color gamut triangle according to the distance, the line-included angle, and the surface-included angle.

By calculating the distance between the target color point in the first color gamut triangle and the color gamut white point, the present application can determine the line-included angle and surface-included angle corresponding to the target color point, the color gamut coordinates of the target color point in the second color gamut triangle can be calculated.

In one embodiment, the preset coordinate system consists of an X axis, a Y axis perpendicular to the X axis, and the color gamut white point; the horizontal line in the preset coordinate system is the X axis; and the step of calculating the line-included angle between the connecting line from the target color point to the color gamut white point and the horizontal line in the preset coordinate system comprises: determining a line-included angle between the connecting line from the target color point to the color gamut white point and the X axis in the preset coordinate system.

The embodiment further determines that the line-included angle is the line-included angle between the connecting line from the target color point and the color gamut white point and the X axis in the preset coordinate system.

In a second aspect, the present application provides a color gamut mapping device, for use in a splicing display device, wherein the splicing display device comprises a first display screen and a second display screen spliced together, and a color gamut of the first display screen in a preset color gamut coordinate system corresponds to a first color gamut triangle formed in a preset coordinate system, a color gamut of the second display screen corresponds to a second color gamut triangle formed in the preset coordinate system, and the color gamuts of the first display screen and the second display screen are different; wherein the color gamut mapping device comprises:

a rotation module for rotating the first color gamut triangle so that color gamut sides of the rotated first color gamut triangle are parallel to respective color gamut sides of the second color gamut triangle to obtain a third color gamut triangle;

a determining module for determining a color gamut adjustment scaling factor of the first color gamut triangle according to the third color gamut triangle and the first color gamut triangle; and a conversion module for scaling the third color gamut triangle according to the color gamut adjustment scaling factor, such that the third color gamut triangle is converted to the second color gamut triangle, and the color gamut of the first display screen matches the color gamut of the second display screen.

In one embodiment, the first color gamut triangle comprises a first red main vertex, a first green main vertex, and a first blue main vertex. The second color gamut triangle comprises a second red main vertex, a second green main vertex, and a second blue main vertex; the rotation module is configured for:

determining a position of a color gamut white point in the second display screen; and rotating the first red main vertex, the first green main vertex, and the first blue main vertex around the color gamut white point, so that color gamut sides of the rotated first color gamut triangle are parallel to the respective color gamut sides of the second color gamut triangle to obtain the third color gamut triangle.

In the present embodiment, a specific method for obtaining the third color gamut triangle by conversion is provided. By rotating the first color gamut triangle, the three color gamut sides of the first color gamut triangle are parallel to the three color gamut sides of the unrotated third color gamut triangle, and the first color gamut triangle is mapped to the plane where the third color gamut triangle is located, so that the third color gamut triangle can be obtained through less adjustment steps.

In one embodiment, the rotation module is configured for:

rotating a first connection line around the color gamut white point to an extension line of a second connection line, and determining that a rotation intersection point is a third red main vertex of the third color gamut triangle, wherein a length of the first connection line is equal to a length of a third connection line, the first connection line is a connecting line between the color gamut white point and the first red main vertex, the second connection line is a connecting line between the color gamut white point and the second red main vertex, and the third connection line is a connecting line between the color gamut white point and the third red main vertex;

rotating a fourth connecting line around the color gamut white point to an extension line of a fifth connection line, and determining that a rotation intersection point is a third green main vertex of the third color gamut triangle, wherein a length of the fourth connection line is equal to a length of a sixth connection line, the fourth connection line is a connecting line between the color gamut white point and the first green main vertex, the fifth connection line is a connecting line between the color gamut white point and the second green main vertex, and the sixth connection line is a connecting line between the color gamut white point and the third green main vertex; and rotating a seventh connection line around the color gamut white point to an extension line of an eighth connection line, and determining that a rotation intersection point is a third blue main vertex of the third color gamut triangle, wherein a length of the seventh connection line is equal to a length of a ninth connection line, and the seventh connection line is a connecting line between the color gamut white point and the first blue main vertex, and the eighth connection line is a connecting line between the color gamut white point and the second blue main vertex, and the ninth connection line is a connecting line between the color gamut white point and the third blue main vertex;

wherein an enclosed area among the third red main vertex, the third blue main vertex, and the third green main vertex is the third color gamut triangle.

In the present embodiment, the connecting lines from different color gamut vertices in the first color gamut triangle to the color gamut white point are rotated, and rotated to extension lines of the connecting lines from different color gamut vertices in the third color gamut triangle to the color gamut white point to obtain three rotated color gamut sides of the first color gamut triangle. Then, with the three rotated color gamut sides, the second color gamut triangle after the rotation of the first color gamut triangle is determined. Such an adjustment is easy.

In one embodiment, the determining module is configured for:
calculating a first angle parameter based on the connecting line between each vertex in the first color gamut triangle and the color gamut white point;
calculating a second angle parameter based on the connecting line between each vertex in the second color gamut triangle and the color gamut white point; and
calculating a color gamut adjustment scaling factor of the first color gamut triangle according to the first angle parameter and the second angle parameter.

The present embodiment calculates the first angle parameter of the first color gamut triangle before rotation, and the second angle parameter of the second color gamut triangle after rotation. The first angle parameter and the second angle parameter are used to determine the color gamut adjustment scaling factor after the first color gamut triangle is rotated. The calculation is simple.

In one embodiment, the determining module is configured for:
determining a first included angle defined by the first green main vertex, the color gamut white point, and the first red main vertex;
determining a second included angle defined by the first red main vertex, the color gamut white point, and the first green main vertex; and
determining a third included angle defined by the first red main vertex, the color gamut white point, and the first blue main vertex;
wherein the first angle parameter comprises the first included angle, the second included angle, and the third included angle.

The present embodiment calculates the angles corresponding to different vertices in the first color gamut triangle to determine the first angle parameter of the first color gamut triangle.

In one embodiment, the determining module is configured for:
calculating a fourth included angle defined by the third blue main vertex, the color gamut white point, and the third red main vertex;
calculating a fifth included angle defined by the third red main vertex, the color gamut white point, and the third green main vertex; and
calculating a sixth included angle defined by the third red main vertex, the color gamut white point, and the third blue main vertex;
wherein the second angle parameter comprises the fourth included angle, the fifth included angle, and the sixth included angle.

The present embodiment calculates the angles corresponding to different vertices in the third color gamut triangle to determine the second angle parameter of the third color gamut triangle.

In one embodiment, the determining module is configured for:
calculating a first color gamut adjustment scaling factor according to the first included angle and the fourth included angle;
calculating a second color gamut adjustment scaling factor according to the first included angle and the fifth included angle; and
calculating a third color gamut adjustment scaling factor according to the first included angle and the sixth included angle;
wherein the color gamut adjustment scaling factor comprises the first color gamut adjustment scaling factor, the second color gamut adjustment scaling factor, and the third color gamut adjustment scaling factor.

According to the two angle parameters before and after the rotation of each included angle in the first color gamut triangle, the different color gamut adjustment scaling factors corresponding to the included angles in the first color gamut triangle are determined to adjust the rotated third color gamut triangle according to the color gamut adjustment scaling factor.

In one embodiment, the conversion module is configured for:
taking any color point in the first color gamut triangle as a target color point, and calculating color gamut coordinates of the target color point in the second color gamut triangle according to the color gamut adjustment scaling factor; and
adjusting coordinates of the target color point based on the color gamut coordinates, such that the target color point is converted into a color point in the second color gamut triangle.

According to the color gamut adjustment scaling factor, the present application can calculate the color gamut coordinates of the color point of the first color gamut triangle in the second color gamut triangle, and then determine the color gamut coordinates of each color point of the first color gamut triangle in the second color gamut triangle. Therefore, the first color gamut triangle can be mapped to the second color gamut triangle to realize the mapping from the first color gamut triangle to the second color gamut triangle, and improve uneven images and the image quality of the first display screen and the second display screen.

In one embodiment, the conversion module is configured for:
calculating a distance between the target color point and the color gamut white point;
calculating a line-included angle between a connecting line from the target color point to the color gamut white point and a horizontal line in the preset coordinate system;
calculating a surface-included angle between a color gamut area where the target color point is located and a horizontal area in the preset coordinate system; and
calculating the color gamut coordinates of the target color point in the second color gamut triangle according to the distance, the line-included angle, and the surface-included angle.

By calculating the distance between the target color point in the first color gamut triangle and the color gamut white point, the present application can determine the line-included angle and surface-included angle corresponding to the target color point, the color gamut coordinates of the target color point in the second color gamut triangle can be calculated.

In one embodiment, the preset coordinate system consists of an X axis, a Y axis perpendicular to the X axis, and the color gamut white point; the horizontal line in the preset coordinate system is the X axis; and the conversion module is configured for: determining a line-included angle between the connecting line from the target color point to the color gamut white point and the X axis in the preset coordinate system.

The embodiment further determines that the line-included angle is the line-included angle between the connecting line from the target color point and the color gamut white point and the X axis in the preset coordinate system.

Advantages of the Present Application

The present application provides a color gamut mapping method and a color gamut mapping device, for use in a splicing display device. Multiple display screens in the splicing display device have different color gamuts. By mapping the color gamuts of multiple display screens to the display screen which is the uniquely determined display screen in the splicing display device, the color gamuts of all the display screens in the splicing display device are the same, and colors displayed on different screens are also the same, thus improving uneven images and the image quality.

BRIEF DESCRIPTION OF DRAWINGS

In order to more clearly illustrate the embodiments of the present invention or related art, figures which will be described in the embodiments are briefly introduced hereinafter. It is obvious that the drawings are only some of the embodiments of the present invention, and a person having ordinary skill in this field can obtain other figures according to these figures without inventive work.

DETAILED DESCRIPTION OF EMBODIMENTS

Figure 1:
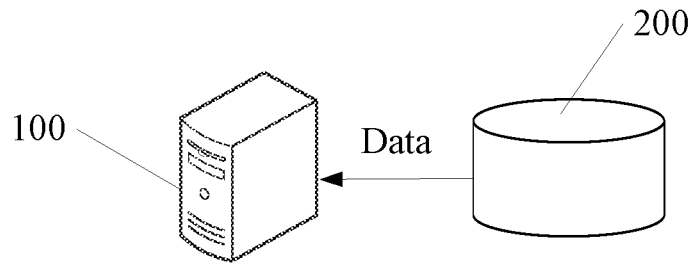
FIG. 1 is a schematic view illustrating a scene of a color gamut mapping system according to one embodiment of the present application.

The technical solutions of the present invention are clearly and completely described below in conjunction with the accompanying drawings and with reference to the embodiments of the present invention. Obviously, the described embodiments are only some of the embodiments of the present invention, rather than all the embodiments. Based on the embodiments of the present invention, all other embodiments obtained by those skilled in the art without creative work shall fall within the protection scope of the present invention.

In the description of the present invention, it should be understood that directional terms such as "center", "longitudinal", "transverse", "length", "width", "thickness", "upper", "lower", "front", "rear", "left", "right", "vertical", "horizontal", "top", "bottom", "inner", and "outer" are based on the orientation or positional relationship shown in the drawings. The directional terms are only for the convenience of describing the present invention and simplifying the description, rather than indicating or implying that the device or element must have a specific orientation, be constructed and operated in a specific orientation, and therefore cannot be understood as a limitation to the present invention. In addition, the terms "first" and "second" are only used for illustrative purposes, and cannot be understood as indicating or implying relative importance or implicitly indicating the number of indicated technical features. Therefore, the features defined with "first" and "second" may explicitly or implicitly include one or more of the features. In the description of the present invention, "multiple" means two or more than two, unless specifically defined otherwise.

In the present application, the word "exemplary" means "serving as an example, a case, or being illustrative." Any embodiment described as "exemplary" in the present application is not necessarily construed as being more preferred or advantageous over other embodiments. In order to enable any person skilled in the art to implement and use the present invention, the following description is given. In the following description, details are provided for the purpose of explanation. It should be understood that those of ordinary skill in the art can realize that the present invention can also be implemented without using these specific details. In other instances, commonly-known structures and processes are not elaborated to avoid unnecessary details to impede the description of the present invention. Therefore, the present invention is not limited to the illustrated embodiments, but is consistent with a widest protection scope that conforms to the principles and features disclosed in the present application.

It should be noted that, since the present application is used in electronic devices, objects processed by the electronic devices are in the form of data or information, like time, specifically time information. It can be understood that in the subsequent embodiments, if the size, quantity, location, etc. are mentioned, they are present in the form of data for the electronic device to process, and the details are not repeated here.

The present invention provides a color gamut mapping method and a color gamut mapping device. Detailed descriptions are given below.

Please refer to FIG. 1. FIG. 1 is a schematic view illustrating a scene of a color gamut mapping system according to one embodiment of the present application. The color gamut mapping system can include an electronic device 100, and the electronic device 100 is integrated with a color gamut mapping device. The electronic device 100 is, for example, an electronic device in FIG. 1.

In the present application, the electronic device 100 can be an independent server, or can be a server network or server cluster composed of servers. For example, the electronic device 100 described in the present application comprises, but is not limited to, a computer and a network host, a single network server, a set of multiple web servers, or a cloud server composed of multiple servers. The cloud server is composed of a large number of computers or network servers based on cloud computing.

Those skilled in the art can understand that the application scenario shown in FIG. 1 is only an application scenario of the present application, and should not be construed as a limitation to the application scenarios of the present application. Other application scenarios can also comprise more or less electronic devices. Only one electronic device is shown in FIG. 1 as an example. It can be understood that the color gamut mapping system can also comprise one or more other servers, and the present application is not limited in this regard.

In addition, as shown in FIG. 1, the color gamut mapping system can further comprise a memory 200 for storing data.

It should be noted that the schematic view of the scene of the color gamut mapping system shown in FIG. 1 is only an example. The color gamut mapping system and the scene described in the present application are only intended to explain the technical solutions of the present application more clearly, and are not limitations to the technical solutions of the present application. Those of ordinary skill in the art can know that with the development of the color gamut mapping system and the emergence of new business scenarios, the technical solutions of the present application are also applicable to similar technical problems.

The color gamut mapping method of the present application is used in a splicing display device. The splicing display device comprises a first display screen and a second display screen spliced together. A color gamut coordinate system can be established for pixels in the first display screen and the second display screen, and the pixels in the first display screen and the second display screen can be mapped to the color gamut coordinate system to obtain a first color gamut triangle corresponding to the first display screen and a second color gamut triangle corresponding to the second display screen.

Figure 2:
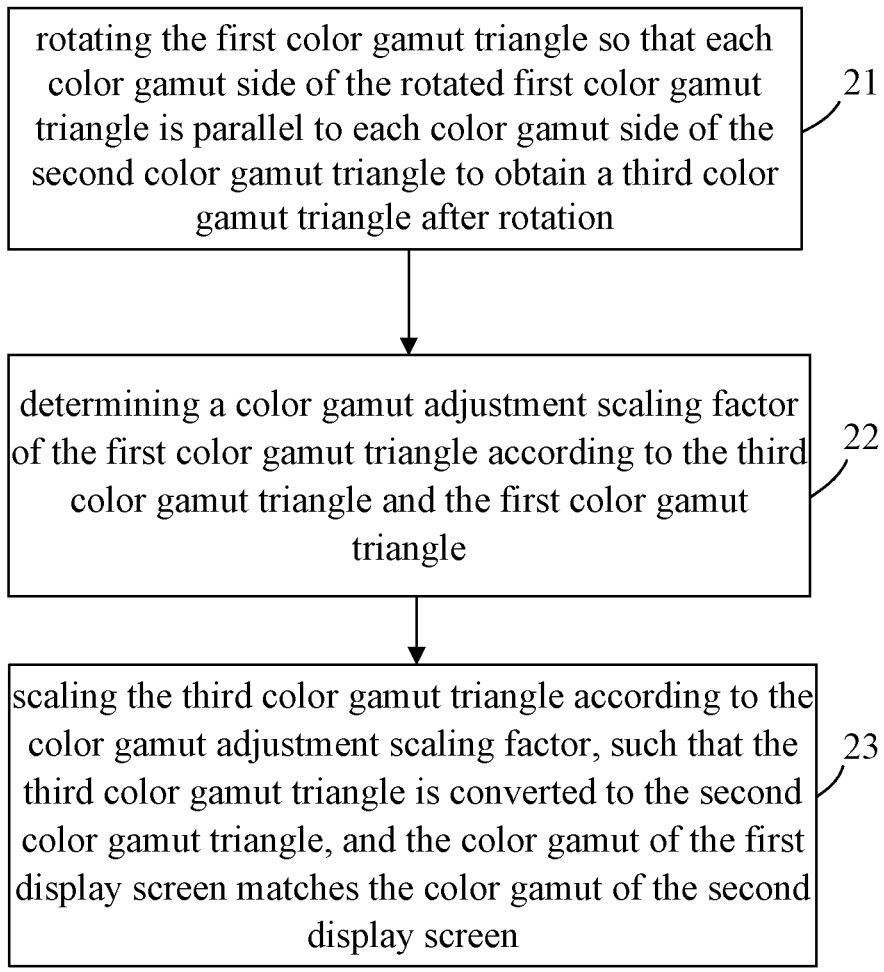
FIG. 2 is a schematic flowchart illustrating a color gamut mapping method according to one embodiment of the present application.

As shown in FIG. 2, it is a schematic flowchart of a color gamut mapping method according to one embodiment of the present application, comprising:

step 21: rotating the first color gamut triangle so that each color gamut side of the rotated first color gamut triangle is parallel to each color gamut side of the second color gamut triangle to obtain a third color gamut triangle after rotation.

Although the first color gamut triangle corresponding to the first display screen and the second color gamut triangle corresponding to the second display screen are both present in the preset color gamut coordinate system, the first color gamut triangle and the second color gamut triangle have different color gamuts. In the present application, the first color gamut triangle and the second color gamut triangle need to be unified, so that the first display screen and the second display screen can display colors in the same color gamut, so as to avoid uneven display images which affect the display performance.

The color gamut coordinate system comprises a color gamut white point and two different coordinate axes, namely an X axis and a Y axis. It should be noted that the color gamut coordinate system usually only comprises the X axis and the Y axis. However, a color screen image displayed on the display screen is usually composed of three primary colors, so the color gamut of the display screen has three color gamut areas.

The first color gamut triangle and the second color gamut triangle in the present application both have multiple different color gamut sides. First, the color gamut sides of the first color gamut triangle are adjusted to be parallel to the color gamut sides of the second color gamut triangle.

Specifically, the first color gamut triangle can be rotated, so that the color gamut sides of the rotated first color gamut triangle are parallel to the respective color gamut sides of the second color gamut triangle to obtain the third color gamut triangle.

Step 22: determining a color gamut adjustment scaling factor of the first color gamut triangle according to the third color gamut triangle and the first color gamut triangle.

Step 23: scaling the third color gamut triangle according to the color gamut adjustment scaling factor, such that the third color gamut triangle is converted to the second color gamut triangle, and the color gamut of the first display screen matches the color gamut of the second display screen.

After rotating the first color gamut triangle to obtain the third color gamut triangle by rotation, the third color gamut triangle needs to be scaled to match a size of the second color gamut triangle. This way, the first color gamut triangle matches the second color gamut triangle, that is, the color gamut of the first display screen matches the color gamut of the second display screen.

The present application mainly determines the color gamut adjustment scaling factor of the first color gamut triangle according to the third color gamut triangle after rotation and the first color gamut triangle before rotation; and according to the color gamut adjustment scaling factor, the present application scales the third color gamut triangle to convert the third color gamut triangle obtained by rotation to the second color gamut triangle.

The color gamut mapping method of the present application is used in the splicing display device. Multiple display screens in the splicing display device have different color gamuts. By mapping the color gamuts of multiple display screens to the display screen which is the uniquely determined display screen in the splicing display device, the color gamuts of all the display screens in the splicing display device are the same, and colors displayed on different screens are also the same, thus improving uneven images and the image quality.

In some embodiments, the first color gamut triangle comprises a first red main vertex, a first green main vertex, and a first blue main vertex. The second color gamut triangle comprises a second red main vertex, a second green main vertex, and a second blue main vertex. Different color gamut sides are obtained from combinations of different color vertices.

In the step of rotating the first color gamut triangle, so that the color gamut sides of the rotated first color gamut triangle are parallel to the respective color gamut sides of the second color gamut triangle to obtain the third color gamut triangle, the color gamut mapping method comprises:
  determining a position of a color gamut white point in the second display screen; and
  rotating the first red main vertex, the first green main vertex, and the first blue main vertex around the color gamut white point, so that the color gamut sides of the rotated first color gamut triangle are parallel to the respective color gamut sides of the second color gamut triangle to obtain the third color gamut triangle.

Specifically, a connecting line is from any one of the first red main vertex, the first green main vertex, and the first blue main vertex to the color gamut white point. In fact, rotating different color vertices around the color gamut white point is rotating different connecting lines around the color gamut white point.

In the step of rotating the first red main vertex, the first green main vertex, and the first blue main vertex around the color gamut white point, so that the color gamut sides of the rotated first color gamut triangle are parallel to the respective color gamut sides of the second color gamut triangle to obtain the third color gamut triangle, the color gamut mapping method comprises:

rotating a first connection line around the color gamut white point to an extension line of a second connection line, and determining that a rotation intersection point is a third red main vertex of the third color gamut triangle, wherein a length of the first connection line is equal to a length of a third connection line, the first connection line is a connecting line between the color gamut white point and the first red main vertex, the second connection line is a connecting line between the color gamut white point and the second red main vertex, and the third connection line is a connecting line between the color gamut white point and the third red main vertex;

rotating a fourth connecting line around the color gamut white point to an extension line of a fifth connection line, and determining that a rotation intersection point is a third green main vertex of the third color gamut triangle, wherein a length of the fourth connection line is equal to a length of a sixth connection line, the fourth connection line is a connecting line between the color gamut white point and the first green main vertex, the fifth connection line is a connecting line between the color gamut white point and the second green main vertex, and the sixth connection line is a connecting line between the color gamut white point and the third green main vertex; and rotating a seventh connection line around the color gamut white point to an extension line of an eighth connection line, and determining that a rotation intersection point is a third blue main vertex of the third color gamut triangle, wherein a length of the seventh connection line is equal to a length of a ninth connection line, and the seventh connection line is a connecting line between the color gamut white point and the first blue main vertex, and the eighth connection line is a connecting line between the color gamut white point and the second blue main vertex, and the ninth connection line is a connecting line between the color gamut white point and the third blue main vertex.

An enclosed area enclosed by lines between the third red main vertex, the third blue main vertex, and the third green main vertex is the third color gamut triangle.

In fact, in the above embodiment, the three different connecting lines from the color gamut white point to the three main vertices in the first color gamut triangle are rotated, and are rotated to directions of the three different connecting lines from the color gamut white points to the three main vertices in the second color gamut triangle, wherein each connecting line has the same length before and after the rotation.

After rotating to obtain different intersection points to obtain the third color gamut triangle, the third color gamut triangle needs to be scaled. Specifically, the third color gamut triangle is scaled according to the color gamut adjustment scaling factor.

Figure 3:
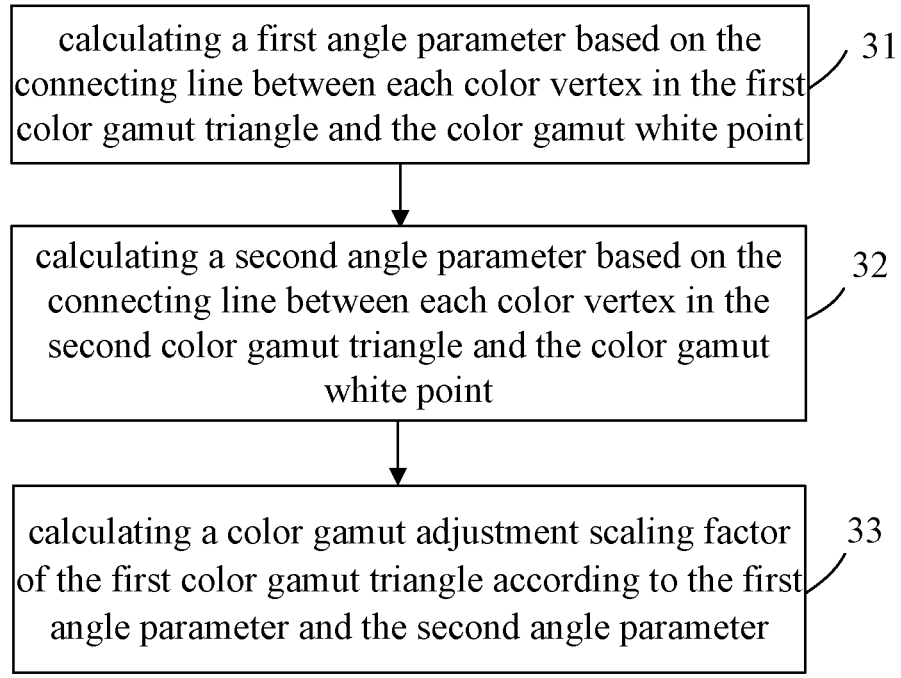
FIG. 3 is a schematic flowchart about determining a color gamut adjustment scaling factor according to one embodiment of the present application.

As shown in FIG. 3, it is a schematic flowchart about determining the color gamut adjustment scaling factor according to one embodiment of the present application, comprising:

step 31: calculating a first angle parameter based on the connecting line between each color vertex in the first color gamut triangle and the color gamut white point.

In details, the step of calculating the first angle parameter based on the connecting line between each vertex in the first color gamut triangle and the color gamut white point comprises:

determining a first included angle defined by the first green main vertex, the color gamut white point, and the first red main vertex (i.e., an included angle between lines from the color gamut white point to the first green main vertex and the first red main vertex);

determining a second included angle defined by the first red main vertex, the color gamut white point, and the first green main vertex; and determining a third included angle defined by the first red main vertex, the color gamut white point, and the first blue main vertex.

The first angle parameter comprises the first included angle, the second included angle, and the third included angle.

step 32: calculating a second angle parameter based on the connecting line between each color vertex in the second color gamut triangle and the color gamut white point.

In details, the step of calculating the second angle parameter based on the connecting line between each vertex in the third color gamut triangle and the color gamut white point comprises:

calculating a fourth included angle defined by the third blue main vertex, the color gamut white point, and the third red main vertex;

calculating a fifth included angle defined by the third red main vertex, the color gamut white point, and the third green main vertex; and calculating a sixth included angle defined by the third red main vertex, the color gamut white point, and the third blue main vertex.

The second angle parameter comprises the fourth included angle, the fifth included angle, and the sixth included angle.

Step 33: calculating a color gamut adjustment scaling factor of the first color gamut triangle according to the first angle parameter and the second angle parameter.

In detail, the step of calculating the color gamut adjustment scaling factor of the first color gamut triangle according to the first angle parameter and the second angle parameter comprises:

calculating a first color gamut adjustment scaling factor according to the first included angle and the fourth included angle;

calculating a second color gamut adjustment scaling factor according to the first included angle and the fifth included angle; and calculating a third color gamut adjustment scaling factor according to the first included angle and the sixth included angle.

The color gamut adjustment scaling factor comprises the first color gamut adjustment scaling factor, the second color gamut adjustment scaling factor, and the third color gamut adjustment scaling factor.

It should be noted that the color gamut adjustment scaling factors calculated in the present application are calculated separately for different color vertices. That is to say, the color gamut adjustment scaling factors corresponding to different color vertices are generally different. In the present application, the color gamut adjustment scaling factor can be: the second angle parameter/the first angle parameter.

After the first color gamut triangle is rotated to obtain the third color gamut triangle, and the color gamut adjustment scaling factor is obtained by calculation, the third color gamut triangle can be scaled to convert the third color gamut triangle to a size corresponding to the second color gamut triangle.

Figure 4:
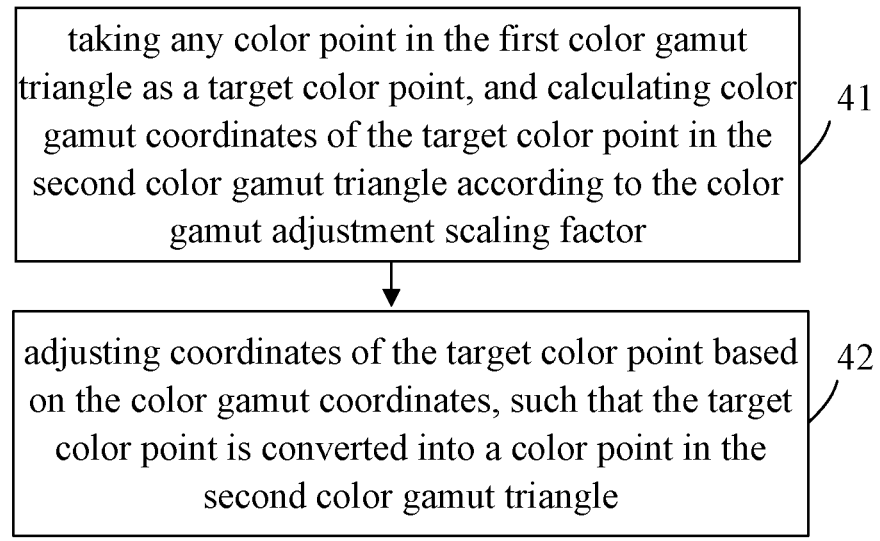
FIG. 4 is a schematic flowchart about scaling up or down a third color gamut triangle according to one embodiment of the present application.

Specifically, FIG. 4 shows a schematic flowchart about scaling the third color gamut triangle according to one embodiment of the present application, comprising:

step 41: taking any color point in the first color gamut triangle as a target color point, and calculating color gamut coordinates of the target color point in the second color gamut triangle according to the color gamut adjustment scaling factor.

In the present application, the first color gamut triangle is rotated to obtain the third color gamut triangle. The present application mainly uses the third color gamut triangle to determine the color gamut adjustment scaling factor.

Figure 5:
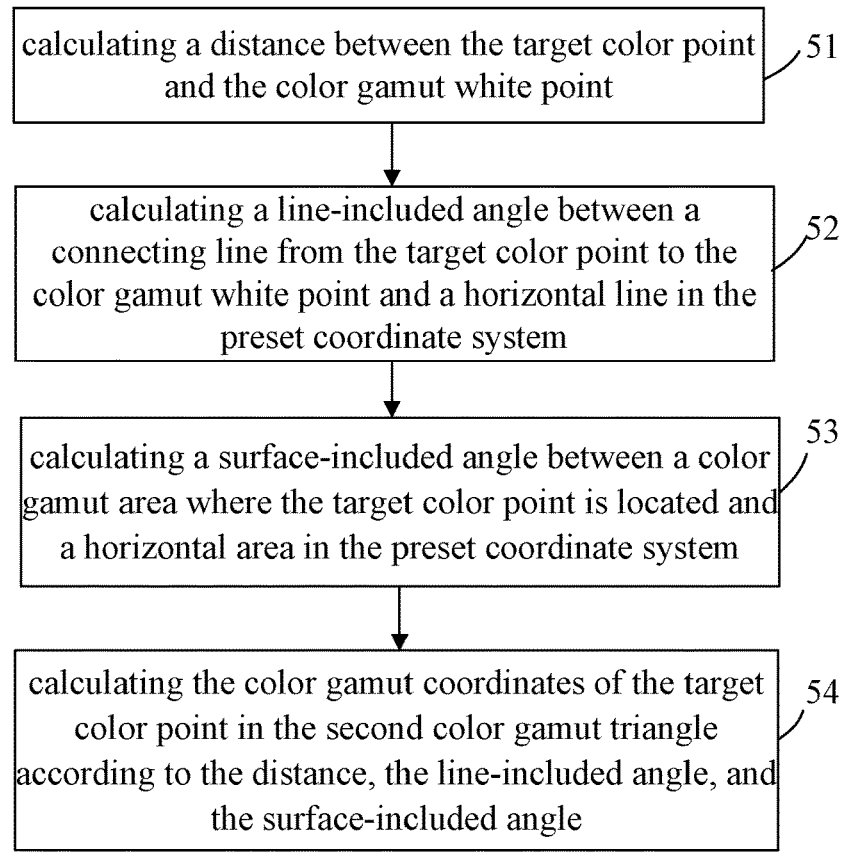
FIG. 5 is a schematic view about determining color gamut coordinates of a target color point in a second color gamut triangle according to one embodiment of the present application.

FIG. 5 is a schematic view about determining the color gamut coordinates of the target color point in the second color gamut triangle according to one embodiment of the present application, comprising:

step 51: calculating a distance between the target color point and the color gamut white point;

step 52: calculating a line-included angle between a connecting line from the target color point to the color gamut white point and a horizontal line in the preset coordinate system;

step 53: calculating a surface-included angle between a color gamut area where the target color point is located and a horizontal area in the preset coordinate system; and step 54: calculating the color gamut coordinates of the target color point in the second color gamut triangle according to the distance, the line-included angle, and the surface-included angle.

In the present application, the first color gamut triangle can be split into a first color gamut area, a second color gamut area, and a third color gamut area according to the position of the color gamut white point. The first color gamut area is an enclosed area among the red main vertex, the color gamut white point, and the first green main vertex. The second color gamut area is an enclosed area among the first green main vertex, the color gamut white point, and the first blue main vertex. The third color gamut area is an enclosed area among the first blue main vertex, the color gamut white point, and the first red main vertex (i.e., an area enclosed by lines between the first blue main vertex, the color gamut white point, and the first red main vertex).

The target color point is any color point in the first color gamut triangle, that is, any color coordinate point in the first color gamut area, the second color gamut area, and the third color gamut area. First, the present application determines a linear distance between the target color point and the color gamut white point can be determined first. Then, the present application determines the line-included angle between the connecting line from the target color point and the color gamut white point and the horizontal line in the preset color coordinate system.

Generally, the preset coordinate system is a color coordinate system. The color coordinate system is usually composed of an X axis, a Y axis perpendicular to the X axis, and the color gamut white point. The horizontal line the present application normally refers to the X-axis. Therefore, determining the line-included angle between the connecting line from the target color point to the color gamut white point and the horizontal line in the preset color coordinate system is actually determining the line-included angle between the connecting line from the target color point and the color gamut white point and the X axis in the preset color coordinate system.

On the basis of the foregoing embodiments, it is also necessary to further determine the color gamut area where the target color point is located, so as to determine a surface-included angle between the color gamut area where the target color point is located and the horizontal area in the preset color coordinate system.

After determining the distance, the line-included angle, and the surface-included angle, the color gamut coordinates of the target color point in the second color gamut triangle can be determined.

Specifically, in some embodiments of the present application, if any color point in the first color gamut triangle is S, and a distance between the color point S and the color gamut white point is L, and a line-included angle corresponding to the color point S is θ1, and a surface-included angle corresponding to the color point S is θ2. Then, when the color point S is converted into a color point in the second color gamut triangle, the new surface-included angle corresponding to the new color point S1 is θ3=θ2*color gamut adjustment scaling factor. That is to say, in the present application, the new surface-included angle corresponding to the new color point after conversion can be determined using the surface-included angle corresponding to the color point before the conversion and the color gamut adjustment scaling factor. The color gamut adjustment scaling factor depends on the color gamut area where the color point is located. When the color point is in a different color gamut area, the color gamut adjustment scaling factor is also different.

Then, when the color point S changes to the color point in the second color gamut triangle, the new line-included angle corresponding to the color point S1 is θ4=θ3+θ5, wherein is the angle between the connecting line from any color vertex in the third color gamut triangle to the color gamut white point W and the horizontal line (that is, the X axis).

Therefore, in the present application, the line-included angle corresponding to the color point converted from any point in the first color gamut triangle is the surface-included angle corresponding to the converted color point S1 plus an included angle between the connecting line from the target color vertex in the third color gamut triangle and the color gamut white point and the horizontal line (that is, the X axis).

This is because when the color point S is in a different color gamut triangle and rotated, not only the position of the color point S is moved, but the color gamut area where the color point S is located is also moved. Therefore, a relative positional relationship between the color gamut area where the color point S is located and a horizontal plane (that is, the horizontal area) is changed. In other words, the surface-included angle corresponding to the color point S is changed, and an angle between the connecting line from the color point S to the color gamut white point W and the horizontal line (that is, the X axis) is also changed.

Therefore, in the present application, the surface-included angle of the color point S1 after conversion is directly determined by the color gamut adjustment scaling factor and the surface-included angle of the color point S before conversion. The line-included angle corresponding to the color point S1 after conversion needs to be determined by the surface-included angle corresponding to the color point S1 after conversion and the angle between the horizontal line (that is, the X axis) and the connecting line from the vertex of the target color vertex to the color gamut white point in the third color gamut triangle after rotation.

After the surface-included angle corresponding to the new color point is determined, an orientation and location of the new color point can be determined, and the coordinates of the new color point need to be further determined to determine the position of the new color point in the color coordinates.

In the present application, the following formula can be used to determine the coordinates of the new color point after conversion:

$$S_X = L/\cos \angle \theta 3$$

$$S_Y = L/\sin \angle \theta 3$$

$S_X$ and $S_Y$ are xy coordinates corresponding to the new color point S1. In the present application, the coordinates of the new color point S1 can be determined by using the distance L between the color point S before conversion and the color gamut white point and the surface-included angle corresponding to the new color point S1 after conversion.

step 42: adjusting coordinates of the target color point based on the color gamut coordinates, such that the target color point is converted into a color point in the second color gamut triangle.

Since the target color point can be any color coordinate point in the first color gamut triangle, the above method can be used to determine the adjusted color coordinates of each color coordinate point in the first color gamut triangle, and then the new second color gamut triangle can be obtained. The second color gamut triangle is the color gamut triangle obtained after adjusting the first color gamut triangle. The color gamut triangle after adjustment matches the original second color gamut triangle.

Figure 6:
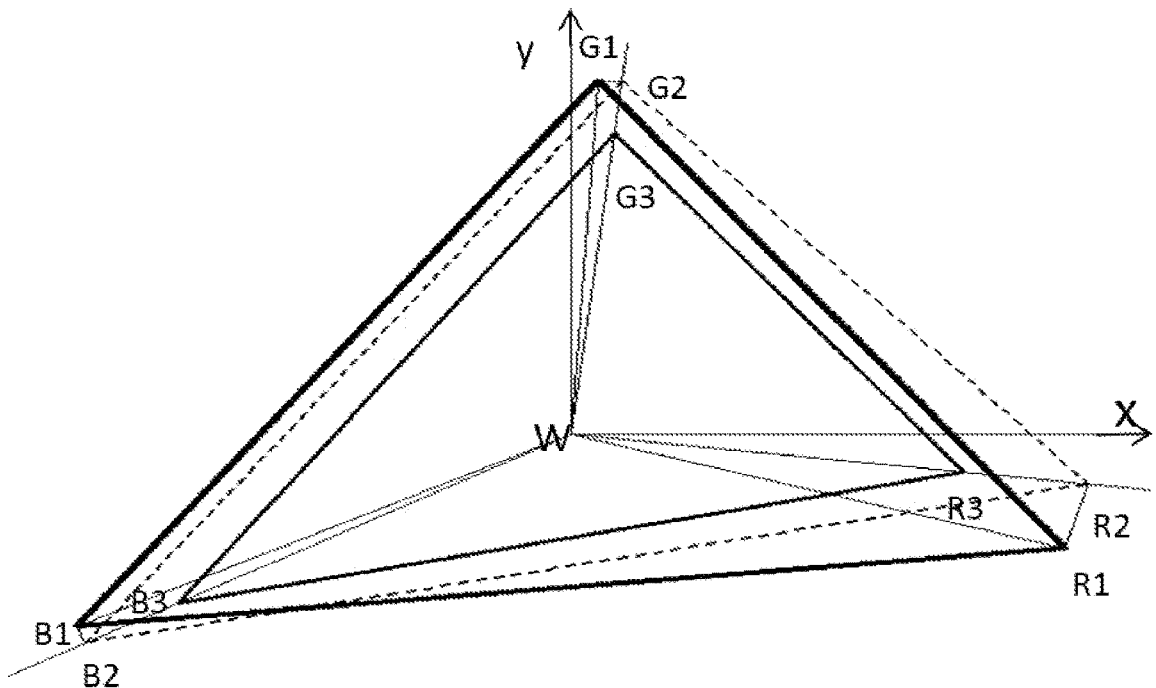
FIG. 6 is a schematic view illustrating a color coordinate system according to one embodiment of the present application.

FIG. 6 is a schematic view of the color coordinate system according to one embodiment of the present application. In FIG. 6, the first color gamut triangle can be $R_1G_1B_1$, which is a color gamut triangle formed by dotted lines in FIG. 6. The third color gamut triangle is $R_3G_3B_3$, which is a color gamut triangle formed by unbold solid lines in the drawing. The second color gamut triangle is $R_2G_2B_2$, which is the color gamut triangle formed by bold solid lines in the drawing. W is the color gamut white point in the color coordinate system. The first color gamut triangle can be divided into three different areas, including $R_1WG_1$, $G_1WB_1$, and $B_1WR_1$.

In fact, in the above embodiments, dividing the first color gamut triangle into three different areas is determining different color gamut triangles by different color vertices. Since the display screen displays an image that is a mixture of three primary colors, the first color gamut triangle is actually a first color gamut triangular pyramid, including three different color gamut areas; the same is true about the second color gamut triangle and the third color gamut triangle, and they are also three-dimensional structures.

Then, rotate $WR_1$, $WG_1$, and $WB_1$ around the color gamut white point W, and rotate them to extension lines of $WR_3$, $WG_3$, and $WB_3$ to obtain three different intersection points $R_2$, $G_2$, and $B_2$ which are color points $R_1$, $G_1$, and $B_1$ after rotation. A length of $WR_1$ is equal to a length of $WR_2$, a length of $WG_1$ is equal to a length of $WG_2$, and a length of $WB_1$ is equal to a length of $WB_3$.

Further, it is necessary to determine degrees of angles such as $\angle G_1WR_1$, $\angle B_1WG_1$, $\angle R_1WB_1$, $\angle G_2WR_2$, $\angle B_2WG_2$, $\angle R_2WB_2$ in order to determine an angle scaling factor (that is, the color gamut adjustment scaling factor) of each area according to the degrees of these angles.

$\theta_{RG} = \angle G_2WR_2/\angle G_1WR_1$, $\theta_{BR} = \angle R_2WB_2/\angle R_1WB_1$, $\theta_{GB} = \angle B_2WG_2/\angle B_1WG_1$. $\theta_{RG}$, $\theta_{BR}$, and $\theta_{GB}$ are the color gamut adjustment scaling factors.

Different areas (or different color vertices) have different color gamut adjustment scaling factors. In the present application, after the color gamut adjustment scaling factors are determined, the first color gamut triangle needs to be converted into the second color gamut triangle.

Specifically, by determining the color point coordinates of any color point S in the first color gamut triangle, then it can be determined the distance $L_{SW}$ between the color point S before conversion and the color gamut white point W, as well as the line-included angle $\angle SWX$ between the connecting line from the color point S to the color gamut white point W and the horizontal line (i.e., the X axis). In addition, it is necessary to determine the area where the color point S is located to determine the surface-included angle $\theta_S$ between the color gamut area where the color point S is located and the horizontal plane.

In a specific embodiment, the color point S is in the $R_1WG_1$ area, and the surface-included angle $\theta_S$ corresponding to the color point S is $\angle SWR_1$. In this case, it can be determined the surface-included angle corresponding to the color point S adjusted to be in the third color gamut triangle. Specifically, the surface-included angle $\theta_{S'}$ corresponding to the color point S' after the adjustment can be $\angle S'WR_2$, specifically $\theta_{S'} = \theta_S * \theta_{RG}$. $\theta_{RG}$ is the color gamut adjustment scaling factor.

In the above embodiment, only the surface-included angle corresponding to the color point S' in the third color gamut triangle is determined. In order to determine a specific position of a color point in the coordinate system, it is necessary to further determine the XYZ coordinates data.

Taking an example in which the coordinate of the color point S is $S_X$, the coordinate of the color point S' after conversion is $S_Y$, and the color point S' is in $R_1WG_1$, then:

$$\angle S'WX = \theta_{S'} + \angle R_2WX$$

$$S_X = L_{SW}/\cos \angle S'WX$$

$$S_Y = L_{SW}/\sin \angle S'WX$$

$\angle S'WX$ is the line-included angle corresponding to the color point S' in the second color gamut triangle after conversion, and $\theta_{S'}$ is the surface-included angle corresponding to the color point S' in the second color gamut triangle after conversion. $\angle R_2WX$ is the angle between the connecting line from the second red main vertex $R_2$ in the second color gamut triangle to the color gamut white point W and the horizontal line.

Please refer to FIG. 6. According to the present application, since the display screen displays a color image formed by mixing three primary colors, the color gamut triangle in the present application is actually a 3-dimensional structure formed by three triangles. However, the present application can perform color gamut mapping for any color gamut area of the three-dimensional structure shown in FIG. 6, and the steps of the color gamut mapping method are unchanged.

The 3-dimensional structure in FIG. 6 comprises three different color gamut areas, $R_1WG_1$, $G_1WB_1$, $B_1WR_1$, when the color points are located in different color gamut areas, the color gamut adjustment scaling factors corresponding to the color points are also different.

It should be noted that the splicing display device described in the present application comprises the first display screen and the second display screen with different color gamuts. The color gamut mapping method of the present application is also applicable when there are more display screens with different color gamuts.

To better implement the color gamut mapping method in the present invention, the present invention further provides a color gamut mapping device on the basis of the color gamut mapping method, which is for use in a splicing display device. The splicing display device comprises a spliced first display screen and a second display screen spliced together. A color gamut of the first display screen corresponds to a first color gamut triangle formed in a preset coordinate system, and a color gamut of the second display screen corresponds to a second color gamut triangle formed in the preset coordinate system. The first display screen and the second display screen have different color gamuts.

Figure 7:
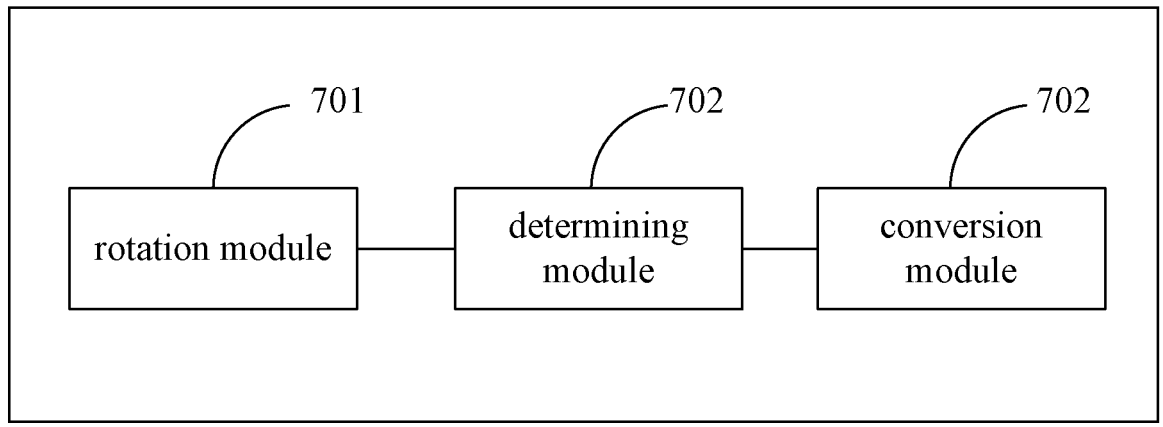
FIG. 7 is a schematic view illustrating a color gamut mapping device according to one embodiment of the present application.

Please refer to FIG. 7, which shows a schematic view of the color gamut mapping device according to one embodiment of the present application, comprising:
- a rotation module 701 for rotating the first color gamut triangle so that color gamut sides of the rotated first color gamut triangle are parallel to respective color gamut sides of the second color gamut triangle to obtain a third color gamut triangle;
- a determining module 702 for determining a color gamut adjustment scaling factor of the first color gamut triangle according to the third color gamut triangle and the first color gamut triangle; and
- a conversion module for scaling the third color gamut triangle according to the color gamut adjustment scaling factor, such that the third color gamut triangle is converted to the second color gamut triangle, and the color gamut of the first display screen matches the color gamut of the second display screen.

The present application provides the color gamut mapping device for use in a splicing display device. Multiple display screens in the splicing display device have different color gamuts. By mapping the color gamuts of multiple display screens to the display screen which is the uniquely determined display screen in the splicing display device, the color gamuts of all the display screens in the splicing display device are the same, and colors displayed on different screens are also the same, thus improving uneven images and the image quality.

In some embodiments of the present application, the first color gamut triangle comprises a first red main vertex, a first green main vertex, and a first blue main vertex. The second color gamut triangle comprises a second red main vertex, a second green main vertex, and a second blue main vertex. The rotation module 701 is configured for: determining a position of a color gamut white point in the second display screen; and rotating the first red main vertex, the first green main vertex, and the first blue main vertex around the color gamut white point, so that color gamut sides of the rotated first color gamut triangle are parallel to the respective color gamut sides of the second color gamut triangle to obtain the third color gamut triangle.

In some embodiments of the present application, the rotation module 701 can also be specifically configured for rotating a first connection line around the color gamut white point to an extension line of a second connection line, and determining that a rotation intersection point is a third red main vertex of the third color gamut triangle, wherein a length of the first connection line is equal to a length of a third connection line, the first connection line is a connecting line between the color gamut white point and the first red main vertex, the second connection line is a connecting line between the color gamut white point and the second red main vertex, and the third connection line is a connecting line between the color gamut white point and the third red main vertex;

rotating a fourth connecting line around the color gamut white point to an extension line of a fifth connection line, and determining that a rotation intersection point is a third green main vertex of the third color gamut triangle, wherein a length of the fourth connection line is equal to a length of a sixth connection line, the fourth connection line is a connecting line between the color gamut white point and the first green main vertex, the fifth connection line is a connecting line between the color gamut white point and the second green main vertex, and the sixth connection line is a connecting line between the color gamut white point and the third green main vertex; and rotating a seventh connection line around the color gamut white point to an extension line of an eighth connection line, and determining that a rotation intersection point is a third blue main vertex of the third color gamut triangle, wherein a length of the seventh connection line is equal to a length of a ninth connection line, and the seventh connection line is a connecting line between the color gamut white point and the first blue main vertex, and the eighth connection line is a connecting line between the color gamut white point and the second blue main vertex, and the ninth connection line is a connecting line between the color gamut white point and the third blue main vertex;

wherein an enclosed area among the third red main vertex, the third blue main vertex, and the third green main vertex is the third color gamut triangle.

In some embodiments of the present application, the determining module 702 is configured for:
- calculating a first angle parameter based on the connecting line between each vertex in the first color gamut triangle and the color gamut white point;
- calculating a second angle parameter based on the connecting line between each vertex in the second color gamut triangle and the color gamut white point; and
- calculating a color gamut adjustment scaling factor of the first color gamut triangle according to the first angle parameter and the second angle parameter.

In some embodiments of the present application, the determining module 702 is configured for: determining a first included angle defined by the first green main vertex, the color gamut white point, and the first red main vertex; determining a second included angle defined by the first red main vertex, the color gamut white point, and the first green main vertex; and determining a third included angle defined by the first red main vertex, the color gamut white point, and the first blue main vertex; wherein the first angle parameter comprises the first included angle, the second included angle, and the third included angle.

In some embodiments of the present application, the determining module 702 is configured for: calculating a fourth included angle defined by the third blue main vertex, the color gamut white point, and the third red main vertex; calculating a fifth included angle defined by the third red main vertex, the color gamut white point, and the third green main vertex; and calculating a sixth included angle defined by the third red main vertex, the color gamut white point, and the third blue main vertex; wherein the second angle parameter comprises the fourth included angle, the fifth included angle, and the sixth included angle.

In some embodiments of the present application, the determining module 702 is configured for: calculating a first color gamut adjustment scaling factor according to the first included angle and the fourth included angle; calculating a second color gamut adjustment scaling factor according to the first included angle and the fifth included angle; and calculating a third color gamut adjustment scaling factor according to the first included angle and the sixth included angle; wherein the color gamut adjustment scaling factor comprises the first color gamut adjustment scaling factor, the second color gamut adjustment scaling factor, and the third color gamut adjustment scaling factor.

In some embodiments of the present application, the conversion module 703 is configured for: taking any color point in the first color gamut triangle as a target color point, and calculating color gamut coordinates of the target color point in the second color gamut triangle according to the color gamut adjustment scaling factor; and adjusting coordinates of the target color point based on the color gamut coordinates, such that the target color point is converted into a color point in the second color gamut triangle.

In some embodiments of the present application, the conversion module 703 is configured for: calculating a distance between the target color point and the color gamut white point; calculating a line-included angle between a connecting line from the target color point to the color gamut white point and a horizontal line in the preset coordinate system; calculating a surface-included angle between a color gamut area where the target color point is located and a horizontal area in the preset coordinate system; and calculating the color gamut coordinates of the target color point in the second color gamut triangle according to the distance, the line-included angle, and the surface-included angle.

Figure 8:
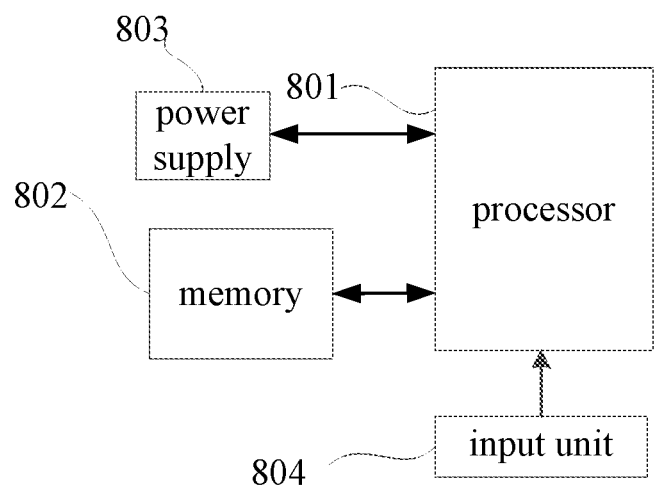
FIG. 8 shows a schematic structural view of an electronic device involved in the present application.

The present application further provides an electronic device that integrates any color gamut mapping device according to one embodiment of the present application. Referring to FIG. 8, it shows a schematic structural view of an electronic device involved in one embodiment of the present application, specifically:

The electronic device can comprise one or more processors 801, one or more computer-readable storage medium memories 802, a power supply 803, an input unit 804. Those skilled in the art can understand that a structure of the electronic device shown in the drawing is not intended to be a limitation to the electronic device, and can comprise more or less components than those shown in the figure, or combine certain components, or have different arrangements for components.

The processor 801 is a control center of the electronic device. The processor 801 uses various interfaces and lines to connect various parts of the entire electronic device. By running or executing software programs and/or modules stored in the memory 802, and calling data stored in the memory 802, the processor 801 performs various functions of the electronic device and processes data of the electronic device, so as to monitor and control the whole electronic device. Optionally, the processor 801 can comprise one or more processing cores. Preferably, the processor 801 can integrate an application processor and a modem processor. The application processor mainly deals with an operation system, a user interface, and application programs, etc. The modem processor mainly deals with wireless communication. It can be understood that the foregoing modem processor can be not integrated into the processor 801.

The memory 802 can be used to store software programs and modules. The processor 801 executes various functional applications and data processing by running the software programs and modules stored in the memory 802. The memory 802 can mainly comprise a program storage area and a data storage area. The program storage area can store the operation system, application programs of at least one function (such as a sound playback function, an image playback function), etc. The data storage area can store data created for use of the electronic device, etc. In addition, the memory 802 can comprise a high-speed random access memory, and can also comprise a non-volatile memory, such as at least one magnetic disk storage device, a flash memory device, or other volatile solid-state storage device. Correspondingly, the memory 802 can further comprise a memory controller for the processor 801 to access the memory 802.

The electronic device also comprises a power supply 803 for supplying power to various components. Preferably, the power supply 803 can be logically connected to the processor 801 through a power management system, so that functions such as charging, discharging, and power consumption management can be managed through the power management system. The power supply 803 can also comprise any components such as one or more DC or AC power supplies, a recharging system, a power failure detection circuit, a power converter, an inverter, or a power status indicator.

The electronic device can further comprise the input unit 804. The input unit 804 is configured for receiving inputted digital or character information, and generate input signals for user settings and function control with a keyboard, a mouse, a joystick, or an optical trackball.

Although not illustrated, the electronic device can also comprise a display unit, etc., which will not be described here. Specifically, in the preset embodiment, the processor 801 in the electronic device load to the memory 802 executable files for processing one or more application programs according to following instructions. The processor 801 runs and stores the application programs in the memory 802, thereby realizing various functions, detailed as follows:

rotating the first color gamut triangle so that color gamut sides of the rotated first color gamut triangle are parallel to respective color gamut sides of the second color gamut triangle to obtain a third color gamut triangle;

determining a color gamut adjustment scaling factor of the first color gamut triangle according to the third color gamut triangle and the first color gamut triangle; and scaling the third color gamut triangle according to the color gamut adjustment scaling factor, such that the third color gamut triangle is converted to the second color gamut triangle, and the color gamut of the first display screen matches the color gamut of the second display screen.

A person of ordinary skill in the art can understand that all or some of the steps in the various methods of the foregoing embodiments can be completed by executing instructions, or by executing instructions to control related hardware. The instructions can be stored in a computer-readable storage medium and loaded and executed by the processor.

Accordingly, the present application provides a computer-readable storage medium, which can comprise: a read only memory (ROM), a random access memory (RAM), magnetic disks, or optical disks. A computer program is stored in the memory, and the computer program is loaded by the processor to execute the steps in any color gamut mapping method provided in the present application. For example, the computer program can be loaded by the processor to perform the following steps:

rotating the first color gamut triangle so that color gamut sides of the rotated first color gamut triangle are parallel to respective color gamut sides of the second color gamut triangle to obtain a third color gamut triangle; determining a color gamut adjustment scaling factor of the first color gamut triangle according to the third color gamut triangle and the first color gamut triangle; and scaling the third color gamut triangle according to the color gamut adjustment scaling factor, such that the third color gamut triangle is converted to the second color gamut triangle, and the color gamut of the first display screen matches the color gamut of the second display screen.

In the above embodiments, the description of each embodiment has its own emphasis. For those that are not described in detail in one embodiment, please refer to other embodiments above, and a detailed description thereof is omitted here for brevity.

In practice, the above units or structures can be embodied independently, or in any combination, or become the same or several entities. For implementation details of the above units or structures, please refer to the previous embodiments, and a detailed description thereof is omitted here for brevity.

The specific details of the above operations, please refer to the previous embodiments, which will not be repeated here.

Please refer to the previous embodiments for specific operation details, and a detailed description is omitted here for brevity.

The color gamut mapping method and the color gamut mapping device of the present invention are described in detail above. Specific examples are used in the present disclosure to illustrate the principles and embodiments of the present invention. The description of the above embodiments is only used for ease of understanding the method and main ideas of the present invention. According to the ideas of the present invention, those skilled in the art can change or modify the embodiments and the protection scope of the present application. In summary, the content of the present specification should not be understood as a limitation to the present invention.

What is claimed is:

1. A color gamut mapping method, for use in a splicing display device, wherein the splicing display device comprises a first display screen and a second display screen spliced together, and a color gamut of the first display screen in a preset color gamut coordinate system corresponds to a first color gamut triangle, a color gamut of the second display screen in the preset color gamut coordinate system corresponds to a second color gamut triangle corresponding to the first color gamut triangle formed in a preset coordinate system, the color gamut of the second display screen corresponds to the second color gamut triangle formed in the preset coordinate system, and the color gamuts of the first display screen and the second display screen are different; wherein the color gamut mapping method comprises:
rotating the first color gamut triangle so that color gamut sides of the rotated first color gamut triangle are parallel to respective color gamut sides of the second color gamut triangle to obtain a third color gamut triangle;
determining a color gamut adjustment scaling factor of the first color gamut triangle according to the third color gamut triangle and the first color gamut triangle; and
scaling the third color gamut triangle according to the color gamut adjustment scaling factor, such that the third color gamut triangle is converted to the second color gamut triangle, and the color gamut of the first display screen matches the color gamut of the second display screen.

2. The color gamut mapping method according to claim 1, wherein the first color gamut triangle comprises a first red main vertex, a first green main vertex, and a first blue main vertex, and the second color gamut triangle comprises a second red main vertex, a second green main vertex, and a second blue main vertex;
in the step of rotating the first color gamut triangle, so that the color gamut sides of the rotated first color gamut triangle are parallel to the respective color gamut sides of the second color gamut triangle to obtain the third color gamut triangle, the color gamut mapping method comprises:
determining a position of a color gamut white point in the second display screen;
rotating the first red main vertex, the first green main vertex, and the first blue main vertex around the color gamut white point, so that the color gamut sides of the rotated first color gamut triangle are parallel to the respective color gamut sides of the second color gamut triangle to obtain the third color gamut triangle.

3. The color gamut mapping method according to claim 2, wherein in the step of rotating the first red main vertex, the first green main vertex, and the first blue main vertex around the color gamut white point, so that the color gamut sides of the rotated first color gamut triangle are parallel to the respective color gamut sides of the second color gamut triangle to obtain the third color gamut triangle, the color gamut mapping method comprises:
rotating a first connection line around the color gamut white point to an extension line of a second connection line, and determining that a rotation intersection point is a third red main vertex of the third color gamut triangle, wherein a length of the first connection line is equal to a length of a third connection line, the first connection line is a connecting line between the color gamut white point and the first red main vertex, the second connection line is a connecting line between the color gamut white point and the second red main vertex, and the third connection line is a connecting line between the color gamut white point and the third red main vertex;
rotating a fourth connecting line around the color gamut white point to an extension line of a fifth connection line, and determining that a rotation intersection point is a third green main vertex of the third color gamut triangle, wherein a length of the fourth connection line is equal to a length of a sixth connection line, the fourth connection line is a connecting line between the color gamut white point and the first green main vertex, the fifth connection line is a connecting line between the color gamut white point and the second green main vertex, and the sixth connection line is a connecting line between the color gamut white point and the third green main vertex; and
rotating a seventh connection line around the color gamut white point to an extension line of an eighth connection line, and determining that a rotation intersection point is a third blue main vertex of the third color gamut triangle, wherein a length of the seventh connection line is equal to a length of a ninth connection line, and the seventh connection line is a connecting line between the color gamut white point and the first blue main vertex, and the eighth connection line is a connecting line between the color gamut white point and the second blue main vertex, and the ninth connection line is a connecting line between the color gamut white point and the third blue main vertex;

wherein an enclosed area among the third red main vertex, the third blue main vertex, and the third green main vertex is the third color gamut triangle.

4. The color gamut mapping method according to claim 3, wherein the step of determining the color gamut adjustment scaling factor of the first color gamut triangle according to the third color gamut triangle and the first color gamut triangle comprises:
   calculating a first angle parameter based on the connecting line between each vertex in the first color gamut triangle and the color gamut white point;
   calculating a second angle parameter based on the connecting line between each vertex in the second color gamut triangle and the color gamut white point; and
   calculating a color gamut adjustment scaling factor of the first color gamut triangle according to the first angle parameter and the second angle parameter.

5. The color gamut mapping method according to claim 4, wherein the step of calculating the first angle parameter based on the connecting line between each vertex in the first color gamut triangle and the color gamut white point comprises:
   determining a first included angle defined by the first green main vertex, the color gamut white point, and the first red main vertex;
   determining a second included angle defined by the first red main vertex, the color gamut white point, and the first green main vertex; and
   determining a third included angle defined by the first red main vertex, the color gamut white point, and the first blue main vertex;
   wherein the first angle parameter comprises the first included angle, the second included angle, and the third included angle.

6. The color gamut mapping method according to claim 5, wherein the step of calculating the second angle parameter based on the connecting line between each vertex in the third color gamut triangle and the color gamut white point comprises:
   calculating a fourth included angle defined by the third blue main vertex, the color gamut white point, and the third red main vertex;
   calculating a fifth included angle defined by the third red main vertex, the color gamut white point, and the third green main vertex; and
   calculating a sixth included angle defined by the third red main vertex, the color gamut white point, and the third blue main vertex;
   wherein the second angle parameter comprises the fourth included angle, the fifth included angle, and the sixth included angle.

7. The color gamut mapping method according to claim 6, wherein the step of calculating the color gamut adjustment scaling factor of the first color gamut triangle according to the first angle parameter and the second angle parameter comprises:
   calculating a first color gamut adjustment scaling factor according to the first included angle and the fourth included angle;
   calculating a second color gamut adjustment scaling factor according to the first included angle and the fifth included angle; and
   calculating a third color gamut adjustment scaling factor according to the first included angle and the sixth included angle;
   wherein the color gamut adjustment scaling factor comprises the first color gamut adjustment scaling factor, the second color gamut adjustment scaling factor, and the third color gamut adjustment scaling factor.

8. The color gamut mapping method according to claim 7, wherein in the step of scaling the third color gamut triangle according to the color gamut adjustment scaling factor, such that the third color gamut triangle is converted to the second color gamut triangle, and the color gamut of the first display screen matches the color gamut of the second display screen, the color gamut mapping method comprises:
   taking any color point in the first color gamut triangle as a target color point, and calculating color gamut coordinates of the target color point in the second color gamut triangle according to the color gamut adjustment scaling factor; and
   adjusting coordinates of the target color point based on the color gamut coordinates, such that the target color point is converted into a color point in the second color gamut triangle.

9. The color gamut mapping method according to claim 8, wherein the step of calculating the color gamut coordinates of the target color point in the second color gamut triangle according to the color gamut adjustment scaling factor comprises:
   calculating a distance between the target color point and the color gamut white point;
   calculating a line-included angle between a connecting line from the target color point to the color gamut white point and a horizontal line in the preset coordinate system;
   calculating a surface-included angle between a color gamut area where the target color point is located and a horizontal area in the preset coordinate system; and
   calculating the color gamut coordinates of the target color point in the second color gamut triangle according to the distance, the line-included angle, and the surface-included angle.

10. The color gamut mapping method according to claim 9, wherein the preset coordinate system consists of an X axis, a Y axis perpendicular to the X axis, and the color gamut white point; the horizontal line in the preset coordinate system is the X axis; and the step of calculating the line-included angle between the connecting line from the target color point to the color gamut white point and the horizontal line in the preset coordinate system comprises: determining a line-included angle between the connecting line from the target color point to the color gamut white point and the X axis in the preset coordinate system.

11. A color gamut mapping device, for use in a splicing display device, wherein the splicing display device comprises a first display screen and a second display screen spliced together, and a color gamut of the first display screen in a preset color gamut coordinate system corresponds to a first color gamut triangle formed in a preset coordinate system, a color gamut of the second display screen corresponds to a second color gamut triangle formed in the preset coordinate system, and the color gamuts of the first display screen and the second display screen are different; wherein the color gamut mapping device comprises:
   a rotation module for rotating the first color gamut triangle so that color gamut sides of the rotated first color gamut triangle are parallel to respective color gamut sides of the second color gamut triangle to obtain a third color gamut triangle;
   a determining module for determining a color gamut adjustment scaling factor of the first color gamut triangle according to the third color gamut triangle and the first color gamut triangle; and a conversion module for scaling the third color gamut triangle according to the color gamut adjustment scaling factor, such that the third color gamut triangle is converted to the second color gamut triangle, and the color gamut of the first display screen matches the color gamut of the second display screen.

12. The color gamut mapping device according to claim 11, wherein the first color gamut triangle comprises a first red main vertex, a first green main vertex, and a first blue main vertex, and the second color gamut triangle comprises a second red main vertex, a second green main vertex, and a second blue main vertex; the rotation module is configured for:
   determining a position of a color gamut white point in the second display screen; and
   rotating the first red main vertex, the first green main vertex, and the first blue main vertex around the color gamut white point, so that color gamut sides of the rotated first color gamut triangle are parallel to the respective color gamut sides of the second color gamut triangle to obtain the third color gamut triangle.

13. The color gamut mapping device according to claim 12, wherein the rotation module is configured for:
   rotating a first connection line around the color gamut white point to an extension line of a second connection line, and determining that a rotation intersection point is a third red main vertex of the third color gamut triangle, wherein a length of the first connection line is equal to a length of a third connection line, the first connection line is a connecting line between the color gamut white point and the first red main vertex, the second connection line is a connecting line between the color gamut white point and the second red main vertex, and the third connection line is a connecting line between the color gamut white point and the third red main vertex;
   rotating a fourth connecting line around the color gamut white point to an extension line of a fifth connection line, and determining that a rotation intersection point is a third green main vertex of the third color gamut triangle, wherein a length of the fourth connection line is equal to a length of a sixth connection line, the fourth connection line is a connecting line between the color gamut white point and the first green main vertex, the fifth connection line is a connecting line between the color gamut white point and the second green main vertex, and the sixth connection line is a connecting line between the color gamut white point and the third green main vertex; and
   rotating a seventh connection line around the color gamut white point to an extension line of an eighth connection line, and determining that a rotation intersection point is a third blue main vertex of the third color gamut triangle, wherein a length of the seventh connection line is equal to a length of a ninth connection line, and the seventh connection line is a connecting line between the color gamut white point and the first blue main vertex, and the eighth connection line is a connecting line between the color gamut white point and the second blue main vertex, and the ninth connection line is a connecting line between the color gamut white point and the third blue main vertex;
   wherein an enclosed area among the third red main vertex, the third blue main vertex, and the third green main vertex is the third color gamut triangle.

14. The color gamut mapping device according to claim 13, wherein the determining module is configured for:
   calculating a first angle parameter based on the connecting line between each vertex in the first color gamut triangle and the color gamut white point;
   calculating a second angle parameter based on the connecting line between each vertex in the second color gamut triangle and the color gamut white point; and
   calculating a color gamut adjustment scaling factor of the first color gamut triangle according to the first angle parameter and the second angle parameter.

15. The color gamut mapping device according to claim 14, wherein the determining module is configured for:
   determining a first included angle defined by the first green main vertex, the color gamut white point, and the first red main vertex;
   determining a second included angle defined by the first red main vertex, the color gamut white point, and the first green main vertex; and
   determining a third included angle defined by the first red main vertex, the color gamut white point, and the first blue main vertex;
   wherein the first angle parameter comprises the first included angle, the second included angle, and the third included angle.

16. The color gamut mapping device according to claim 15, wherein the determining module is configured for:
   calculating a fourth included angle defined by the third blue main vertex, the color gamut white point, and the third red main vertex;
   calculating a fifth included angle defined by the third red main vertex, the color gamut white point, and the third green main vertex; and
   calculating a sixth included angle defined by the third red main vertex, the color gamut white point, and the third blue main vertex;
   wherein the second angle parameter comprises the fourth included angle, the fifth included angle, and the sixth included angle.

17. The color gamut mapping device according to claim 16, wherein the determining module is configured for:
   calculating a first color gamut adjustment scaling factor according to the first included angle and the fourth included angle;
   calculating a second color gamut adjustment scaling factor according to the first included angle and the fifth included angle; and
   calculating a third color gamut adjustment scaling factor according to the first included angle and the sixth included angle;
   wherein the color gamut adjustment scaling factor comprises the first color gamut adjustment scaling factor, the second color gamut adjustment scaling factor, and the third color gamut adjustment scaling factor.

18. The color gamut mapping method according to claim 17, wherein the conversion module is configured for:
   taking any color point in the first color gamut triangle as a target color point, and calculating color gamut coordinates of the target color point in the second color gamut triangle according to the color gamut adjustment scaling factor; and
   adjusting coordinates of the target color point based on the color gamut coordinates, such that the target color point is converted into a color point in the second color gamut triangle.

19. The color gamut mapping device according to claim 18, wherein the conversion module is configured for:
   calculating a distance between the target color point and the color gamut white point;

calculating a line-included angle between a connecting line from the target color point to the color gamut white point and a horizontal line in the preset coordinate system;

calculating a surface-included angle between a color gamut area where the target color point is located and a horizontal area in the preset coordinate system; and calculating the color gamut coordinates of the target color point in the second color gamut triangle according to the distance, the line-included angle, and the surface-included angle.

20. The color gamut mapping device according to claim 19, wherein the preset coordinate system consists of an X axis, a Y axis perpendicular to the X axis, and the color gamut white point; the horizontal line in the preset coordinate system is the X axis; and the conversion module is configured for: determining a line-included angle between the connecting line from the target color point to the color gamut white point and the X axis in the preset coordinate system.

* * * * *